United States Patent [19]
Herb

[11] Patent Number: 5,483,563
[45] Date of Patent: Jan. 9, 1996

[54] CLEANING PROCESS FOR ENHANCING THE BOND INTEGRITY OF MULTI-LAYERED ZIRCONIUM AND ZIRCONIUM ALLOY TUBING

[75] Inventor: Brett J. Herb, Salem, Oreg.

[73] Assignee: Teledyne Industries, Inc., Albany, Oreg.

[21] Appl. No.: 219,482

[22] Filed: Mar. 29, 1994

[51] Int. Cl.$^6$ .................................................. G21C 1/04
[52] U.S. Cl. .................... 376/347; 376/416; 376/457; 376/414
[58] Field of Search ...................... 376/347, 416, 376/457, 414; 148/672, 527, 655

[56] References Cited

U.S. PATENT DOCUMENTS

| | | | |
|---|---|---|---|
| 3,885,922 | 5/1975 | Thomas, Jr. et al. | 29/191 |
| 4,709,848 | 12/1987 | Saller | 228/158 |
| 4,974,375 | 12/1990 | Tada et al. | 51/41.3 |
| 4,977,034 | 12/1990 | Wang | 428/548 |
| 5,081,068 | 1/1992 | Endo et al. | 437/225 |
| 5,195,280 | 3/1993 | Nicholson et al. | 51/436 |
| 5,209,028 | 5/1993 | McDermott et al. | 51/426 |
| 5,308,404 | 5/1994 | Yam et al. | 134/7 |
| 5,315,793 | 5/1994 | Peterson et al. | 51/415 |
| 5,318,636 | 6/1994 | Sziics | 134/7 |

*Primary Examiner*—Donald P. Walsh
*Assistant Examiner*—Meena Chelliah
*Attorney, Agent, or Firm*—Shoemaker and Mattare, Ltd.

[57] ABSTRACT

Zirconium or zirconium alloy components of a cylindrical shape are cleaned with an ice blasting process to produce a defect-free bondline in multi-layered tubing suitable for nuclear fuel cladding and the chemical processing industry. The ice blasting process improves the integrity of the metallurgical bond by removing foreign contamination that can initiate non-bonding defects.

6 Claims, 2 Drawing Sheets

CLEANING PROCESS FOR ENHANCING THE BOND INTEGRITY OF MULTI-LAYERED ZIRCONIUM AND ZIRCONIUM ALLOY TUBING

BACKGROUND OF THE INVENTION

Fabrication of the seamless tubing with multi-layered metals provides superior corrosion, strength, or performance properties over that offered by tubing with only a one layer composition. The demand for high performance nuclear fuel cladding material is increasing due to higher nuclear fuel burn-ups and longer component lifetime requirements. Generally, the extrusion billet is assembled with multiple metallic cylinders of different alloys to produce a thin inside or outside layer. Typical products include a zirconium alloy outside layer on a zirconium alloy base material called duplex, a zirconium inside layer with a zirconium alloy base called barrier, or a zirconium layer between two zirconium alloy layers called triplex.

The process involves machining the zirconium or zirconium alloy components into base and liner assemblies. The components are typically cleaned to remove foreign debris like dirt and oil by pickling in baths of hydrofluoric and nitric acids before assembling into billet components. The annular opening at each end of the component is sealed by electron beam welding the end joints in vacuum. The welded billet is preheated between 550°–750° C. and extruded into a seamless tube. The extrusion cycle metallurgically bonds the dissimilar metals by temperature and pressure. The stringent quality requirements of the nuclear industry require inspection by ultrasonic techniques for bondline defects. The sensitivity of the ultrasonic test typically detects defects larger than 125 µm in transverse width.

The metallurgical bond between the two metallic layers is influenced by the extrusion cycle and component cleaning process prior to billet assembly. The short extrusion cycle may not adequately bond the two or more metallic layers especially if contamination exists in the annulus of the billet. Thus, U.S. Pat. No. 4,977,034 proposed to heal the bondline defects by hot isostatic pressing instead of eliminating the cause of defects. The contamination is typically of a zirconium-fluoride species that remains chemically bonded to the cleaned component after the hydrofluoric acid pickling. During the extrusion cycle, regions of the bondzone with a high concentration of fluoride-rich residue form voids where the dissimilar metals fail to bond. Small bondline voids may not be detected with ultrasonic inspection but can be revealed by destructive testing. Bondline defects can be detrimental to the fuel cladding's performance since a large void can create discontinuities in the heat transfer efficiency and cause a localized increase in the corrosion rate for the duplex type tubing. The present invention provides a process to improve the bond integrity between the metallic layers by cleaning the cylindrical components by ice blasting.

SUMMARY OF THE INVENTION

This invention provides a process to manufacture a substantially defect-free bondzone between the interface of two dissimilar metallic layers. The base and liner components are ice blasted to remove foreign contaminants like dirt and oil so as to assure a clean surface prior to assembling both cylindrical components into a billet. The cleaning action results from the use of ice particles approximately 1–5 mm diameter (or longest dimension), that are propelled by a gas pressure of 75–500 psi, at a temperature above freezing. The ice particles displace surface contaminants on impact by the force of the gas pressure. This occurs when ice particles deform laterally to exert a shear force which begins as mechanical scrubbing and ends as liquid flushing during the phase change from solid to liquid. The utilization of ice blast cleaning results in a decontaminated surface ready for bonding without metal removal or environmental liabilities.

DETAILED DESCRIPTION OF THE INVENTION

Figure 2:
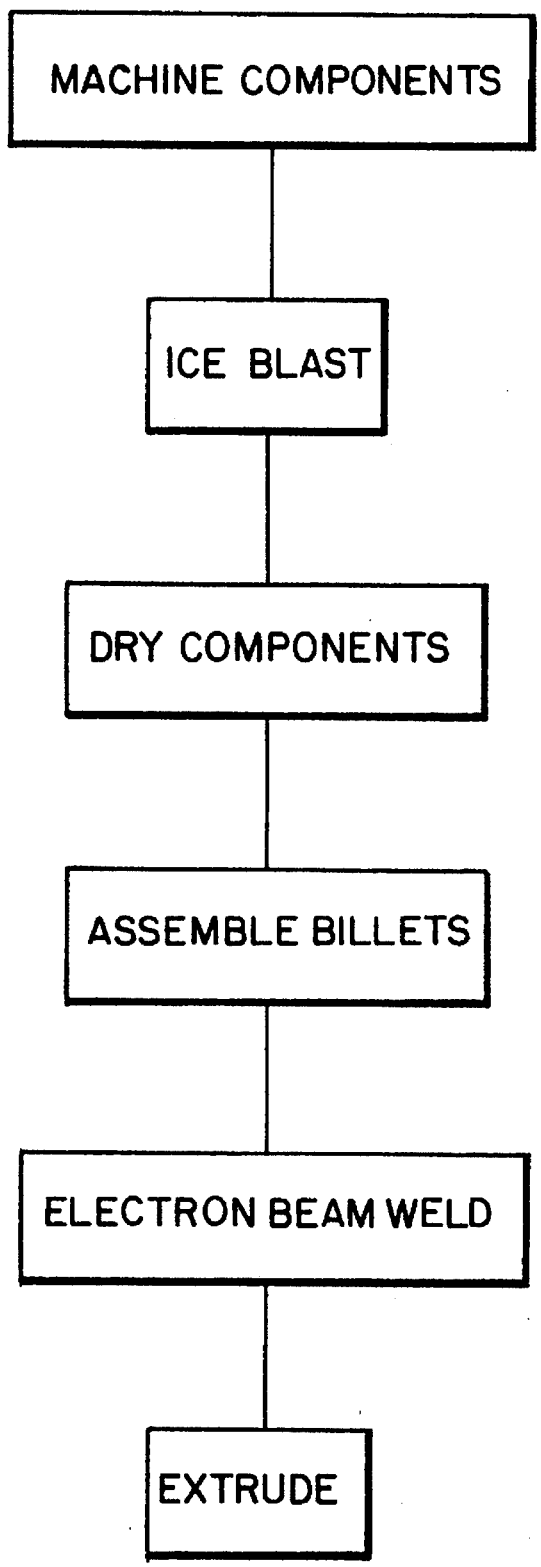
FIG. 2 is a flow diagram of the ice blast cleaning process.

The processing steps necessary for ice blasting zirconium and zirconium alloy components are shown in FIG. 2. After ice blasting a drying step is necessary to remove any moisture before assembling the components into a billet. The end joints on the billet are then electron beam welded in a vacuum to seal the annulus. The welded billet is then heated to 550°–750° C. and extruded into tubing which is suitable for further cold working into nuclear fuel cladding.

Ultrasonic testing on extruded tubing shows that metallic components cleaned by ice blasting have a defect-free bondline. Destructive testing on cross sectional samples cut from the tubes revealed no bondzone voids that escaped detection by ultrasonic testing. The samples were analyzed using optical microscopy. Given these attributes, metallic components cleaned with ice blasting represent a significant improvement in the bonding integrity of multi-layered tubing.

EXAMPLE 1

Zirconium alloy components used to produce external liner tubing were ice blasted prior to billet assembly. A surface quality monitor confirmed the cleaning ability of ice blasting during fabrication. The surface quality monitor is able to detect a clean or contaminated surface based on the number of electrons returning from a surface when exposed to ultraviolet light. A low reading on the surface quality monitor corresponds to a contaminated surface while a high reading corresponds to a clean surface. Although the test values of the surface quality monitor are unitless, the values provide a quantitative test for determining the cleanliness of surfaces. The surface test produced readings of approximately 30 on the as-machined component before ice blasting and approximately 200 after ice blasting. Surface readings of hydrofluoric acid pickled components are approximately 165.

EXAMPLE 2

Figure 1:
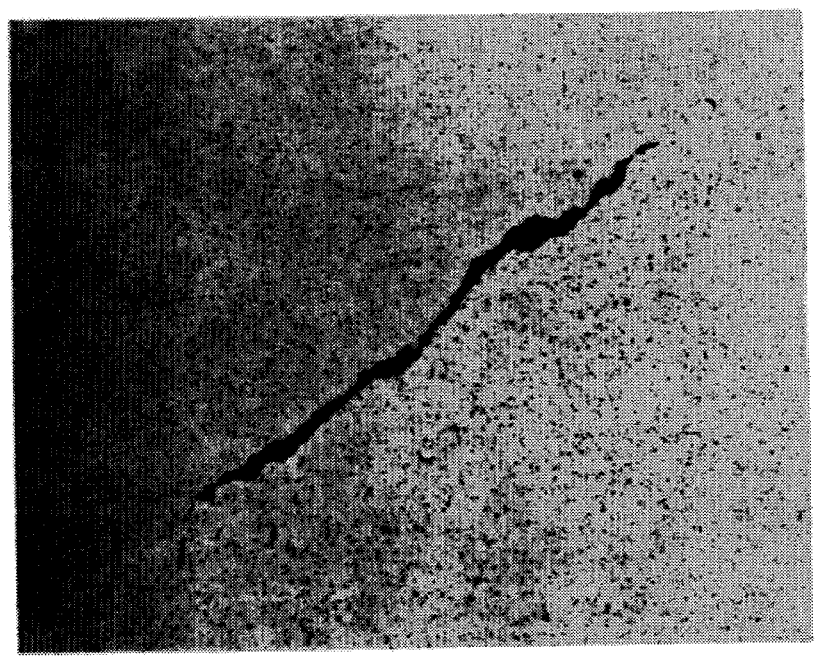
FIG. 1 shows a transverse cross-section of external liner zirconium tubing with a non-bonded defect between the metallic layers due to residual fluoride contamination. The approximately 200 µm transverse width defect was detected by ultrasonic testing. Magnification 275:1.
Figure 3:
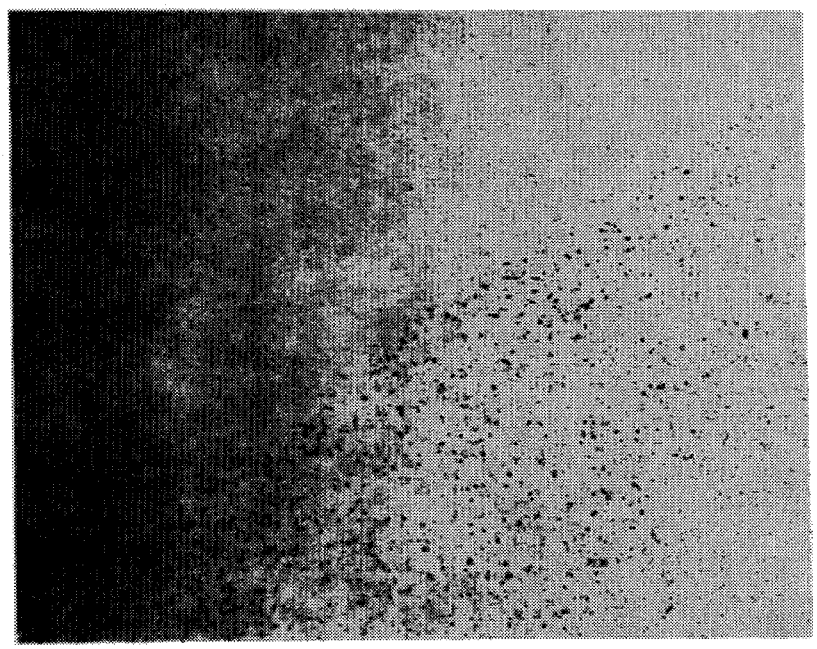
FIG. 3 shows a transverse cross-section external liner zirconium alloy tubing with a defect-free bondline. Components were cleaned with ice blasting prior to billet assembly. Magnification 5001.

Four sets of zirconium alloy components described in EXAMPLE 1 were ice blasted and assembled into billets. The annulus of the billet was sealed by electron beam welding in vacuum. The billets were heated to 550°–750° C. and extruded to 63.5 mm OD×10.9 mm WT×L. Evaluation of the bond integrity was performed by ultrasonic and destructive testing techniques. Both test methods failed to discover any bondline voids at the interface of the multi-layered tube. FIG. 3 shows a photomicrograph of the defect-free bondline that was manufacture by ice blasting.

This invention has been described with respect to the preferred practice thereof known to the inventor. Alterations can be made in the particle size and temperature and pressure and composition of the propellant gas, and the duration of the cleaning cycle, to achieve the results desired without undue experimentation. The scope of the invention is therefore to be defined by the appended claims interpreted in light of the pertinent prior art.

I claim:

1. A process for preparing a metal surface for bonding with an adjacent metal surface comprising the steps of:
   a) providing ice particles having particles sizes in the range of from about 1 mm to about 5 mm in longest dimension;
   b) propelling the ice particles against the metal surface to be cleaned under with a gas pressure of from about 75 to about 500 psi., for a preselected time and under conditions which permits some melting of the ice particles as the surface is contacted with the ice particles, whereby both mechanical scrubbing and liquid flushing occurs during the duration of the cleaning cycle.

2. A process for fabricating a bonded multi-walled tube substantially free of bondline defects comprising the steps of:
   a) machining smooth matching surfaces on the interior and exterior of two interfitting tubes to be bonded together;
   b) ice blasting the machined surfaces by accelerating ice particles against the machined surfaces under sufficient pressure and for a sufficient period of time to render the surfaces substantially free of bondline defect forming materials;
   c) drying the tubes;
   d) assembling the tubes together, in a unitary tube;
   e) extruding the tubing under sufficient heat and pressure to bond the tubes together.

3. The process of claim 2, wherein at least one of the tubes is zirconium metal.

4. The process of claim 3, wherein at least one of the tubes is an alloy containing zirconium metal.

5. Multi-walled tubing substantially free of bondline defects wherein said tubing is comprised of containing zirconium metal and zirconium metal alloys which are bonded together by extrusion, wherein the surface of at least one wall of adjacent walls to be bonded were cleaned of bondline defect forming materials by propelling ice particles against the surface to be bonded, under sufficient gas pressure force to substantially remove bondline defect forming material.

6. A method of cleaning a metal surface comprising the step of contacting the surface to be cleaned with particles of ice having a longest dimension between about 1 mm and 5 mm under a sufficient gas pressure and at a temperature above freezing sufficient to clean the surface of the metal by impingement of the ice particles and flushing with water melted from the ice during the cleaning cycle.

* * * * *